3,716,412
ELECTRIC STORAGE BATTERIES
Kenneth Peters, Walkden, England, assignor to Electric Power Storage Limited, Swinton, Manchester, England
No Drawing. Filed Feb. 19, 1971, Ser. No. 117,119
Int. Cl. H01m 9/00, 35/30
U.S. Cl. 136—34                                  6 Claims

ABSTRACT OF THE DISCLOSURE

A lead acid battery having an improved acid electrolyte is disclosed. The electrolyte in the battery contains not more than 75 grams of amorphous silica (calculated as $SiO_2$) per litre of electrolyte whereby the resistance to shedding of active material from the positive electrode of the battery is enhanced.

---

The present invention relates to lead acid electric storage batteries having improved cycle lives and to novel electrolyte compositions for use in lead acid electric storage batteries whereby the improved cycle lives are obtained.

The present invention is based on the observation that the incorporation of finely divided amorphous silica in the acid electrolyte in concentrations much lower than hitherto used to produce gelled or so called immobilised electrolytes results in the active material of the positive plate having increased resistance to shedding while being free of the problems associated with such electrolytes. This enables the battery to have increased cycle life provided of course that the battery is adequate in other respects.

Thus according to the present invention an acid electrolyte composition adapted for use in lead acid batteries contains amorphous silica in an amount such that in use in the battery, after any necessary addition of deionized or distilled water to the composition, the electrolyte in the battery will contain up to 75 grams, for example 5 or 10 to 50 and preferably 10 to 30 grams, of amorphous silica (calculated as $SiO_2$) per litre of electrolyte whereby the resistance to shedding of active material from the positive electrode of a lead acid battery incorporating that electrolyte composition is enhanced. The invention also includes a lead acid battery having such an electrolyte.

Desirably the amorphous silica (amorphous to X-rays) has a submicron ultimate particle size as measured by a Coulter counter, for example in the range 10 to 50 millimicrons though it may be agglomerated to larger average particle sizes for example of micron size such as 1 to 15 e.g. 5 to 10 microns or be of such larger ultimate particle size.

The amorphous silica can be added as such, for example, as the proprietory material Gasil e.g. Gasil 23 sold by Joseph Crosfield & Sons Limited and described in their Technical Publication No. 25 printed April 1969 (reference M. 598). Clearly the amorphous silica must be free of any concentration of ions, such as chloride ions, which would have a deleterious effect on battery performance or otherwise be objectionable.

Gasil is made by precipitation of a gel from sodium silicate solution with acid followed by drying washing and hydrothermal or steam treatment to produce a material having a pore size of the order of 120 to 140 angstroms with a surface area of 100 to 300 e.g. about 200 square metres per gram and a small particle size as described above e.g. 5 microns or less e.g. 1 to 5 microns. Gasil 23 has a maximum percentage weight loss of 12% at 1000° C., a pH of 6 to 8 as a 10% aqueous suspension, an oil absorption of 285 to 345 grams per 100 grams and the solids after ignition have a minimum silica content of 99.0%.

A general description of the nature and properties of amorphous silicas useful in the present invention is contained in the article by S. A. Mitchell at pages 924 to 933 of "Chemistry and Industry," 1966.

The disclosures of these two documents are incorporated herein by reference.

The amorphous silica can instead be formed in situ from a silicate such as sodium silicate which does not possess as intefering ion. Thus the amorphous silica can be produced merely by adding sodium silicate to the acid electrolyte in an amount such that the electrolyte in use contains up to 75 grams per litre of amorphous silica.

The electrolyte may be that which will remain in the battery throughout its life or can be that which is used merely for the electrolytic formation of the green pasted positive plates. The plates can then be used either with the novel electrolyte or a conventional electrolyte in the battery.

The invention thus extends to a process for the elecrolytic formation of lead acid battery electrodes characterized in that the electrolyte composition in which the electrodes are formed contains not more than 75 grams of amorphous silica (calculated as $SiO_2$) per litre of electrolyte.

In a further alternative embodiment the amorphous silica is placed in the battery separately from the liquid electrolyte for example as a tablet; the size of the tablet being such that the electrolyte in the battery contains up to 75 grams per litre (as $SiO_2$) of amorphous silica.

The invention thus also extends to a lead acid battery in dry charged form containing solid amorphous silica in an amount such that, on addition of the electrolyte in the battery will have a composition in accordance with the invention.

The invention may be put into practice in various ways and a number of specific examples will be given by way of example.

Examples 1 to 5

Varying amounts of Gasil 23 amorphous silica were added to the electrolyte of normal test cells having conventional 6% antimony lead grids. The positive active material was 100% leady oxide with a liquor composition of 198 ccs. per kilogram of liquor in the paste, containing 70.6 ccs. of $H_2SO_4$ of 1.400 sp. gravity per kg. of oxide, and 127.4 ccs. of water per kg. oxide. The leady oxide contains 40% lead and 60% lead monoxide (or as high as 70% or 80%). The cells contained 420 ml. sulphuric acid of 1.26 specific gravity in each cell. Each cell contained 4 positive plates and thus approximately 350 grams of active material as $PbO_2$). 5 such cells for each silica concentration were formed in dry charged condition in a conventional manner by charging each plate singly in a conventional forming electrolyte and then drying the formed plate in a vacuum or in inert gas. The plates were then assembled in the cell and the electrolyte added and left to soak for 20 minutes after which the cells had a voltage of about 1.7 volts per cell. The cells were then discharged at 132 amps to a voltage of 1.00 volts per cell. The cells without silica had an average discharge duration of 4.8 minutes; those with 10 grams per litre (Example 1), 5.1 minutes; those with 20 (Example 2), 30 (Example 4) and 40 (Example 4) gram per litre 4.9 minutes, and those with 50 grams per litre (Example 5) 4.5 minutes.

The cells were then recharged at 2 amps for 20 hours and then discharged at 132 amps to a cell voltage of 1.33 volts per cell.

The cells without silica had an average discharge duration of 6.8 minutes; those with 10 grams per litre, 8.4 minutes; those with 20 grams per litre, 8.5 minutes; those with 30 grams per litre, 8.3 minutes; those with 40 grams per litre, 7.0 minutes; and those with 50 grams per litre, 7.7 minutes.

The electrolytes were all non thixotropic having viscosities at 25° C. less than 25 centipoise measured on a Brookfield viscometer and preferably in the range 15 to 25 centipoise.

At higher concentrations e.g. above 100 grams per litre the electrolyte is significantly thickened and tends to have even thixotropic properties and significantly higher viscosities. This appears to reduce the materials ability to wet the separators and the active material and thus reduces the batteries performance.

It is thus desired in the present invention to use concentrations of amorphous silica such that the viscosity of the electrolyte is not affected in this way i.e. the electrolyte is essentially fluid and its viscosity is independent of shear rate and desirably is less than 30 centipoise at 25° C.

Electrolytes which are gel-like or thixotropic can also under certain conditions separate away from the plates and even crack, thus very severely affecting battery performance.

Other tests with the cells described above and similar ones indicated that the cells with no amorphous silica in the electrolyte had cycle lives varying from 50 to 125 while those with amorphous silica added to the electrolyte had cycle lives of 150 to 525 cycles. These were measured on a discharge of 16 amps for 1 hour and recharging at 4 amps for 5 hours i.e. a 20% overcharge.

Example 3 (continued)

In a further test a cell of this type with about 30 grams per litre (0.30% w./w.) (as $SiO_2$) of amorphous silica (Gasil 23) in the electrolyte had a shedding rate of 0.11% w./w. of positive active material per cycle compared with a shedding rate of 0.17 w./w. per cycle for an identical battery with no amorphous silica added to the electrolyte i.e. a 30% reduction in shedding rate.

Example 6

The addition of amorphous silica also improves the high rate discharge performance of this type of lead acid battery. Thus a similar battery with no added silica had a capacity of 40 ampere hours at the 20 hour rate, 13.6 ampere hours at the $3C_{20}/25°$ C. rate i.e. a discharge of 120 amps at 25° C., and 8.8 ampere hours at the $3C_{20}/-18°$ C. rate. An identical battery containing 25 grams per litre (as $SiO_2$) of amorphous silica (Gasil 23) has capacities of 45 ampere hours, 18.8 ampere hours and 12.9 ampere hours at the same discharge rates.

Example 1 (continued)

At the 20 hour discharge rate a cell with no amorphous silica added to the electrolyte gave 0.095 ampere hours per ml. acid.

Using 10 grams of amorphous silica per litre the figure rose to 0.105 ampere hours per ml. acid.

At a high rate discharge, $3C_{20}/25°$ C., a cell having electrolyte with no silica gave 0.033 ampere hour per ml. of acid and a cell having 10 grams amorphous silica per litre gave 0.045 ampere hours per ml. acid.

What I claim as my invention and desire to secure by Letters Patent is:

1. In an acid electrolyte composition for use in lead acid batteries wherein the electrolyte contains sulphuric acid, water and silica, the improvement comprising said silica being amorphous, and the electrolyte containing from 5 to 30 grams of amorphous silica (calculated as $SiO_2$) per litre of electrolyte, whereby said composition is non-thixotropic.

2. A composition as claimed in claim 1 wherein said amorphous silica is added as such to the electrolyte and prior to addition said silica has a particle size of 1 to 15 microns and a surface area of 100 to 300 square metres per gram.

3. An electrolyte composition as in claim 1 having a viscosity at 25° C. of less than 25 centipoise.

4. A lead acid battery comprising positive active material of leady oxide and said electrolyte composition as in claim 1.

5. A lead acid battery in dry charged form comprising solid amorphous silica in an amount such that on addition of the electrolyte liquid comprising sulphuric acid and water the electrolyte in the battery contains from 5 to 30 grams of amorphous silica (calculated as $SiO_2$).

6. A process for the electrolytic formation of lead acid battery electrodes which comprises the step of: preparing an electrolyte composition containing from 5 to 75 grams of amorphous silica (calculated as $SiO_2$) per litre of electrolyte, immersing the electrodes in said composition, and electrolytically forming said electrodes by passing a current through said electrodes.

References Cited

UNITED STATES PATENTS

| | | | |
|---|---|---|---|
| 3,408,233 | 10/1968 | Parker et al. | 136—153 |
| 1,416,195 | 5/1922 | Hacking | 136—157 |
| 2,650,257 | 8/1953 | Jolley | 136—154 |
| 3,418,166 | 12/1968 | Carter | 136—154 |

DONALD T. WALTON, Primary Examiner

U.S. Cl. X.R.

136—154, 161